May 8, 1962  F. PERRUCA  3,033,048
POWER TRANSMISSION DEVICES
Filed Dec. 29, 1958  3 Sheets-Sheet 1

May 8, 1962 F. PERRUCA 3,033,048
POWER TRANSMISSION DEVICES
Filed Dec. 29, 1958 3 Sheets-Sheet 2

May 8, 1962  F. PERRUCA  3,033,048
POWER TRANSMISSION DEVICES
Filed Dec. 29, 1958  3 Sheets-Sheet 3

3,033,048
POWER TRANSMISSION DEVICES
Felix Perruca, Saint-Etienne, Loire, France, assignor to Societe des Fabrications Unicum, Saint-Etienne, Loire, France, a limited liability company
Filed Dec. 29, 1958, Ser. No. 783,249
Claims priority, application France Jan. 9, 1958
14 Claims. (Cl. 74—200)

This invention relates to power transmission devices and refers more particularly to such devices for compensating for variations in the resistance torque relative to the driving torque in a friction-type change-speed arrangement.

Figure 1:
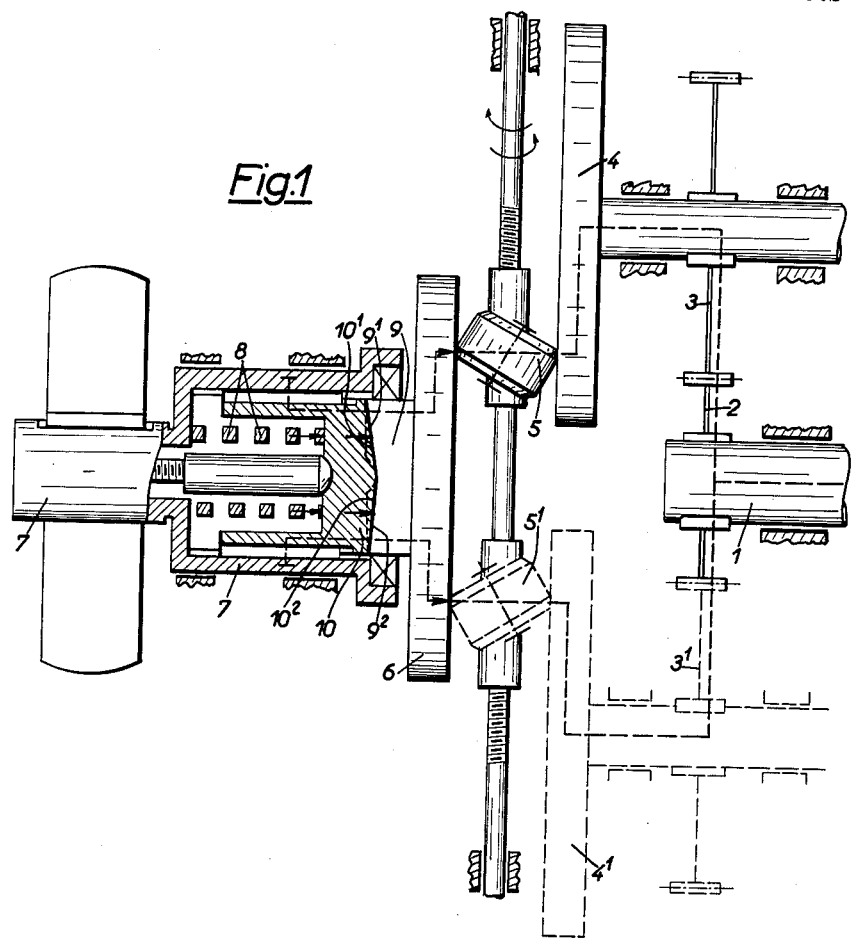
Figure 2:
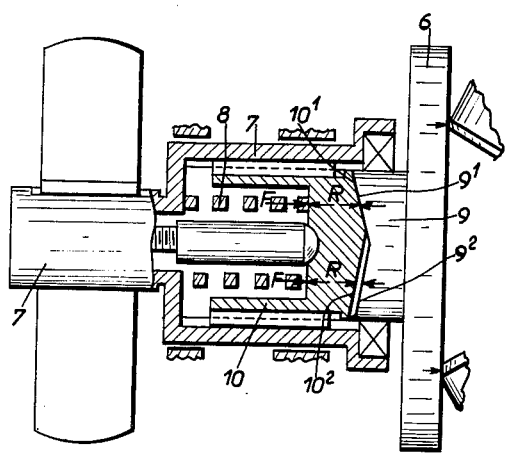

Reference will now be made to FIGURES 1 and 2 of the accompanying drawings in which FIGURE 1 is a diagrammatic side elevational view partly in section, of a known friction-type change-speed gear arrangement, and FIGURE 2 is a similar view of part of such an arrangement.

1 designates a driving shaft to which a driving torque can be applied. The shaft 1 is arranged to drive via a gear train comprising gear wheels 2 and 3, a plane wheel 4. The shaft 1 may also be arranged to drive a further plane wheel $4^1$ (shown in broken lines) via a gear train comprising the gear wheels 2 and $3^1$ (shown in broken lines). A roller 5 is subjected to pressure between the wheel 4 and a driven wheel 6 so that the wheel 6 is driven by the wheel 4 through the roller 5. Where a further plane wheel $4^1$ is employed a further roller $5^1$ (shown in broken lines) is arranged between the wheel $4^1$ and the driven wheel 6, so that the wheel 6 is also driven by the wheel $4^1$ as well as the wheel 4. An output shaft 7 is arranged to be driven by the wheel 6 via a power transmission device, which will be hereinafter described. The power transmission line from the driving shaft 1 to the output shaft 7 is indicated by broken lines.

In order to ensure adequate driving pressure between the rollers 5, $5^1$ and the wheels in frictional engagement therewith at different working speeds, it is known to interpose between the wheel 6 and the output shaft 7, a pressure transmission device adapted to compensate for variations in the magnitude of the resistance torque of the output shaft with respect to the driving torque applied to said shaft. The above mentioned transmission device is arranged as follows:

A pressure member 10 which is rotatable with the output shaft 7 is urged, by a spring 8, axially of the shaft 7 so as to bear against a member 9 fixedly attached to the wheel 6. The abutting faces of the members 9 and 10 each have two pairs of opposed ramps $9^1$, $9^2$ and $10^1$, $10^2$ respectively. Each of these ramps corresponds to a portion of the surface of the thread of a square section screw thread over one quarter of the pitch of the thread. In accordance with the direction of the relative angular displacement of the members 9 and 10, two of the ramps of each member are during operation of the device always in contact over a considerable portion of their surfaces. Alternatively the corresponding ramp surfaces of the members 9 and 10 may be formed with concave recesses cooperating to accommodate bearing balls displaceable in accordance with the direction of the relative angular displacement of the members 9 and 10, axial pressure being developed as the balls are displaced. Between the balls and the members 9 and 10 however, there is a one-bearing contact line in the form of a sector of a circle. The above ball bearing arrangement is not shown in the drawings. The above described transmission devices are all of somewhat complicated construction and consist of a plurality of parts. Although such transmission devices in which balls are disposed between the members can transmit torque variations sensitively owing to the effect of such variations upon a single line of balls, in the recesses in the members 9 and 10, depressions may be formed in the recesses whereby the balls are no longer displaceable in the recesses so that the device becomes inoperable. In known devices in which the ramps bear against one another the ramps have merely a slight angle of slope so that differences in torque are transmitted via axial pressure with a desired degree of responsiveness. The slope however, must be sufficiently steep for the angular relative displacement of the members 9 and 10 to be reversible. If however, the slope is too steep the variations in axial thrust are poor particularly at high speeds and do not follow all the variations of the resistance torque. In FIGURES 1 and 2 the direction and magnitude of the forces exerted are indicated by arrows.

When ramps $9^1$—$9^2$ and $10^1$—$10^2$ have a slight angle of slope as is generally the case having regards to the limit within which reversibility of the angular displacement of the members is possible, good axial pressures are obtained at high speeds whereas at low speeds there is excessive thrust. The said reversibility is poor in the case of both high and low speeds when the slope is slight.

A further disadvantage of the above described devices is that when axial pressure is exerted on the wheel 6 and roller 5 owing to the arrangement of the ramps of the members 9 and 10, such axial pressure neutralises, by reaction in the opposite sense, the thrust of the spring 8. The spring 8 is interposed between the end of the bore in the shaft 7 and the member 10. FIGURE 2 shows that, where there is a considerable variation in the resistant torque, the axial thrust resulting from the force at the ramps $9^1$—$9^2$ and $10^1$—$10^2$ is transmitted not only in the direction of the wheel 6 and the roller 5 but by reaction in the opposite direction as well, that is to say in the direction of the arrow R, FIGURE 2. The force F of the spring 8 is diminished and is in some cases even cancelled out. This is undesirable, since the maximum pressure should be in the direction of the wheel 6 and the roller 5.

It is an object of the invention to provide a power transmission device for compensating for variations in the resistance torque relative to the driving torque in a friction-type change-speed gear arrangement in which device the pressure of the resilient means against the last driven wheel of the gear train of the arrangement is always exerted positively against said wheel during operation of the device.

It is a further object of the invention to provide such a device in which the pressure of the resilient means against the plate is increased as the working speed of the device decreases.

It is another object of the invention to provide such a device in which the ramps of the pressure members have steeply inclined surfaces and in which the angular displacement of the pressure members is readily reversible.

It is also an object of the invention to provide such a device in which the amount of slip between the abutment faces of the pressure members during operation of the device is negligible.

In accordance with the present invention there is provided a power transmission device for compensating for variations in the resistance torque relative to the driving torque in a friction type change-speed gear arrangement; comprising a first pressure member mounted for rotation with the last driven wheel of the gear train of said arrangement, a second pressure member mounted for rotation with the output shaft of said arrangement, said members being engageable for drivably connecting said first member to said second member, means for maintaining said members in contact with one another when the device is operating, resilient means interposed between the output shaft and the non-driven face of the driving wheel to exert a continuous pressure against said face.

Figure 3:
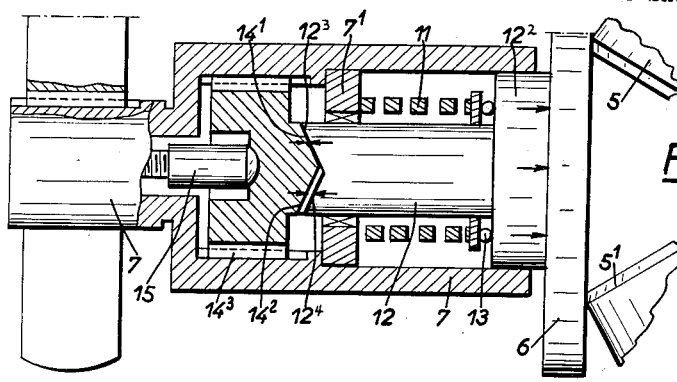
Figure 4:
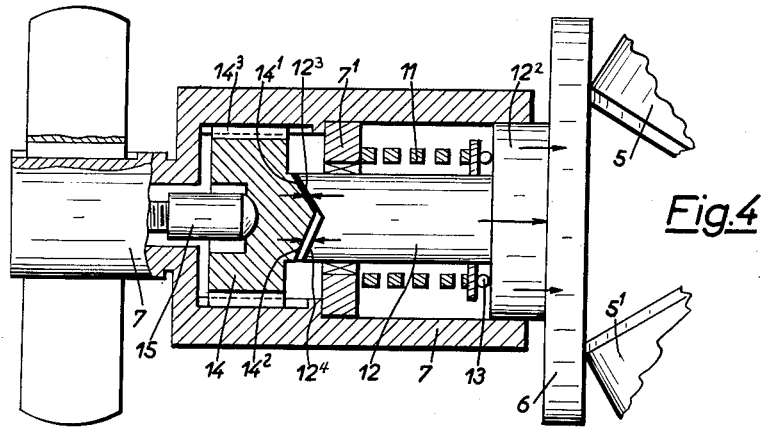
Figure 5:
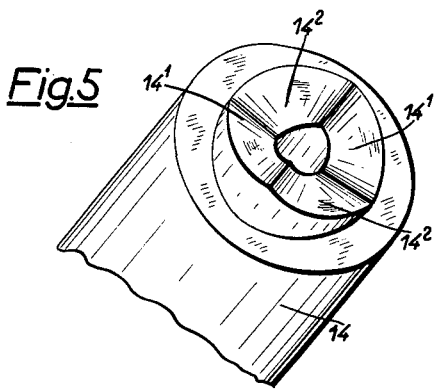
Figure 6:
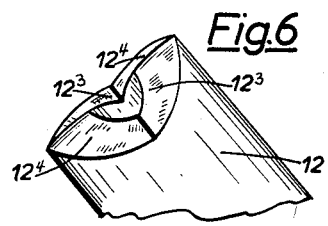

Other objects of the invention will become more apparent as the following description proceeds, especially when taken into consideration with the following drawings, wherein:

FIGURES 3 and 4 are each a side elevational view partly in section of a power transmission device according to the invention, FIGURES 5 and 6 are each a perspective view of a detail of the device shown in FIGURES 1 and 2, drawn to a larger scale than that employed in FIGURE 1 or 2, FIGURES 7 and 8 are each side elevational view partly in section of a practical constructional example of a power transmission device according to the invention.

Reference will now be made to FIGURES 3 and 4 of the accompanying drawings.

Resilient means for applying continuous pressure, which in the embodiment shown in the above figures is a coil spring 11 having a large cross-section, is mounted coaxially with a pressure member 12, so as to be somewhat compressed, between a bearing member $7^1$ in the bore of an output shaft 7, and the base $12^2$ of the pressure member 12 connected to a driven wheel 6 drivable by means of rollers 5 and $5^1$. Alternatively the spring 11 could be arranged so as to bear directly against the wheel 6, the base $12^2$ being omitted. A ball type thrust bearing 13 is interposed between the spring 11 and the base $12^2$ so as to allow a slight angular displacement between the spring 11 and the member 12. The member 12 is provided with contact ramps $12^3$, $12^4$, forwardly of the bearing member $7^1$, which element is adapted to guide and support member 12. The ramps $12^3$ and $12^4$ are arranged to cooperate with corresponding ramps $14^1$, $14^2$ on a second pressure member 14, which is mounted in a bore of the shaft 7. The member 14 is arranged to be rotatable with the shaft 7 by means of keys $14^3$. Means other than the keys $14^3$ may be employed for connecting the member 14 to the shaft 7. The member 14 is arrested in known manner in the direction of the end of the bore, by an abutment 15 forming part of a device or means for automatically taking up play. The device for automatically taking up play is effective to urge pressure members 12 and 14 together when wheel 6 rotates. The ramps $12^3$, $12^4$ and $14^1$, $14^2$ are steeply inclined, so that the angular displacement of the members 12 and 14 relative to one another is readily reversible. This arrangement of the ramps has considerable sensitivity to variation in resistance torque for average and low speeds.

Since the pressure of the spring 11 is exerted entirely in the direction of the wheel 6 and rollers 5 and $5^1$, the arrangement remains sensitive at high speeds. The direction and magnitude of the pressures exerted at high speeds are indicated by arrows in FIGURE 3. The pressure of the spring 11 is additive to the pressures due to the reaction of the ramps $12^3$, $12^4$ and $14^1$, $14^2$, even where the last mentioned pressure is very slight. A pressure of a desirably high value is therefore provided between the wheel 6 and rollers 5, $5^1$. At average and low speeds the pressure of the spring 11 supplements the pressure due to the reaction of the ramps $12^3$, $12^4$ and $14^1$, $14^2$, which latter pressure is considerable under such speed conditions. The magnitudes and directions of the pressures obtaining at average and low speeds are indicated in FIGURE 4 by arrows. The pressure between the rollers 5, $5^1$ and the wheel 6 is greater at low and average speeds than at high speeds. The spring 11 is smaller in diameter in the embodiment shown in FIGURES 3 and 4 than in the known arrangement shown in FIGURES 1 and 2. In the embodiment shown in FIGURES 3 and 4, ramp type, instead of ball type, pressure surfaces on the abutting members can be used at all working speeds of the transmission device.

Figure 7:
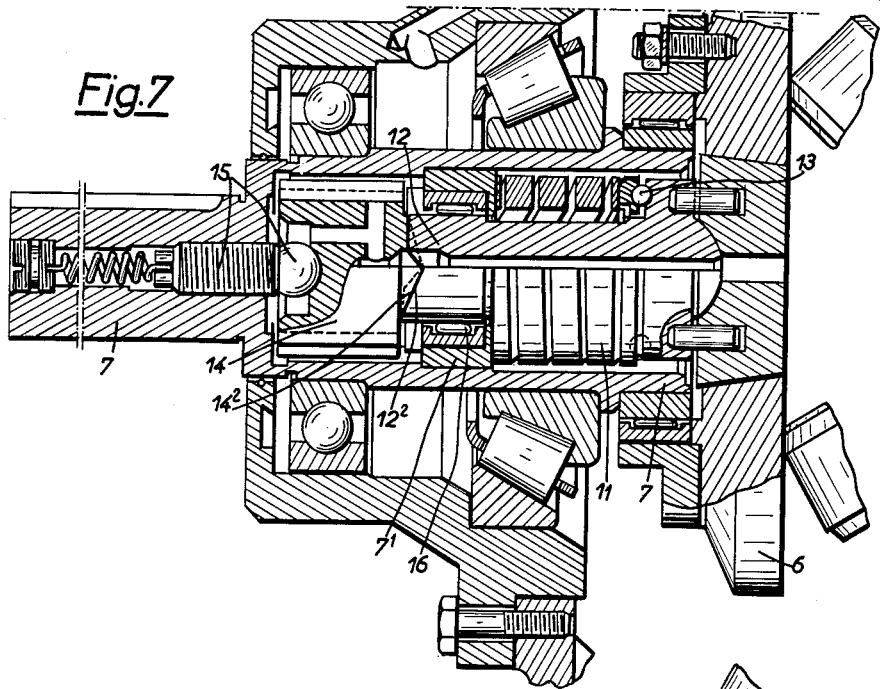

A practical constructional example of an embodiment of a transmission device is shown in FIGURE 7. In this embodiment two rollers 5 and $5^1$ are employed for driving a plane wheel 6. The parts of the gear arrangement which correspond to the parts shown in FIGURES 3 to 6 have the same designations as those parts. A needle roller bearing 16 is mounted in a bearing member $7^1$ which is keyed in the bore of an output shaft 7. The purpose of the bearing 16 is to render a pressure member 12 freely displaceable angularly relative to a second pressure member 14. A ball type thrust bearing 13 also is provided for this purpose. An abutment 15 is provided for the same purpose as the abutment 15 shown in FIGURES 3 and 4 in order to urge pressure members 12 and 14 together so as to maintain them in contact with each other during operation of the transmission device.

Figure 8:
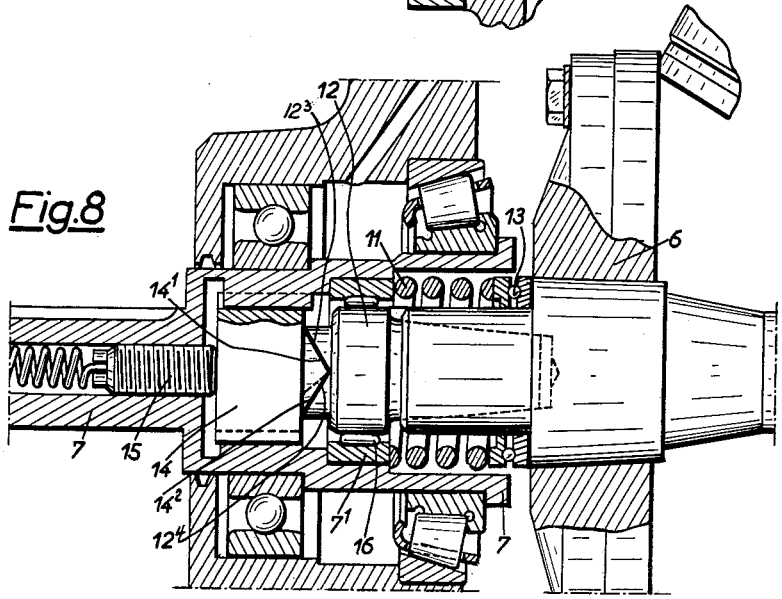

A further practical constructional example of an embodiment is shown in FIGURE 8. The wheel 6 being drivable by a single roller 5. This embodiment operates in the same manner as that shown in FIGURE 7 and differs from the embodiment shown in FIGURE 7 merely in constructional detail. In all the aforementioned embodiments balls carried in recesses in the ramps of the pressure members, can be employed instead of direct contact ramps.

FIGURES 3 to 8 of the drawings and the foregoing specification constitute a description of power transmission devices according to the invention in such full, clear, concise and exact terms as to enable any person skilled in the art to practice the invention, the scope of which is indicated by the appended claims.

I claim:

1. A power transmission device for compensating for variations in the resistance torque relative to the driving torque in a friction-type change-speed gear arrangement, comprising a first pressure member mounted for rotation with the last driven wheel of the gear train of said arrangement, which wheel is displaceable in the direction of the axis of rotation thereof, a second pressure member mounted for rotation with the output shaft of said arrangement, an abutment face on said second member for connecting said first member to said second member in driving relationship therewith, means for urging said members towards one another when said wheel is rotating and resilient means interposed between said shaft and the non-driven face of said driven wheel to exert a continuous pressure in the axial direction of said shaft to urge said wheel in one sense of said direction and to urge said shaft in the opposite sense thereof.

2. A device as defined in claim 1, in which the abutment faces are formed by the inclined surfaces of ramps located on said pressure members.

3. A device as defined in claim 1, in which each pressure member is cylindrical, an end face of the cylinder in the case of each pressure member being formed as the abutment face thereof.

4. A device as defined in claim 1, in which said second pressure member is axially displaceable relative to said shaft and is located in a bore of said shaft.

5. A device as defined in claim 1, in which said resilient means comprises at least one helical spring located between a bearing member for rotatably carrying said first pressure member, which bearing member is mounted in a bore in said shaft, and a base plate for the first pressure member, said plate being fixedly attached to the non-driven surface of said wheel, said spring being directed axially of said shaft and exerting a continuous pressure on said bearing member and said plate.

6. A power transmission device for compensating for variations in the resistance torque relative to the driving torque in a friction-type change-speed gear arrangement; comprising a first pressure member mounted for rotation with the last driven wheel of the gear train of said arrangement which wheel is displaceable in the direction of the axis of rotation thereof; a second pressure member mounted for rotation with the output shaft of said arrangement; an abutment face formed by the steeply inclined surfaces of ramps on said first member; a similar abutment face on said second member engageable with said face on said first member for connecting said second member to said first member in driven relationship therewith; said ramps cooperating to urge said members apart from one another when said wheel is rotating; and a spring interposed between said shaft and the non-driven face of said driven wheel to exert a continuous pressure in the axial direction of said shaft independently of said first and second pressure members to urge said wheel in one sense of said direction and to urge said shaft in the opposite sense thereof, said spring being helical and being disposed between a bearing member for rotatably carrying said first pressure member which bearing member is mounted in a bore in said shaft, and a base plate for the first pressure member, said plate being integrally formed with the non-driven surface of said wheel, said spring being directed axially of the shaft and exerting a continuous pressure on said bearing member and said plate, said base plate being rotatably supported in said bore.

7. A power transmission device for compensating for variations in the resistance torque relative to the driving torque in a friction-type change-speed gear arrangement; comprising a first pressure member mounted for rotation with the last driven wheel of the gear train of said arrangement which wheel is displaceable in the direction of the axis of rotation thereof; a second pressure member mounted for rotation with the output shaft of said arrangement; an abutment face formed by the steeply inclined surfaces of ramps on said first member; a similar abutment face on said second member engageable with said face on said first member for connecting said second member to said first member in driven relationship therewith; said ramps cooperating to urge said members apart from one another when said wheel is rotating; and a spring interposed between said shaft and the non-driven face of said driven wheel to exert a continuous pressure in the axial direction of said shaft independently of said first and second pressure members to urge said wheel in one sense of said direction and to urge said shaft in the opposite sense thereof, said second pressure member being axially displaceable relative to said shaft and being mounted in a bore of said shaft, an abutment member being provided for limiting the axial displacement of said second pressure member.

8. A power transmission device for compensating for variations in the resistance torque relative to the driving torque in a friction-type change-speed gear arrangement; in which a first pressure member is mounted for rotation with the last driven wheel of the gear train of said arrangement which wheel is displaceable in the axial direction thereof, a second pressure member being mounted for rotation in the output shaft of said arrangement, said second pressure member being mounted for free axial movement relative to the output shaft; ramps located on each pressure member for drivably connecting said first member to said second member, being in the case of each member arc shaped in plan view and being arranged in similar pairs, the ramps of each pair being similar and opposed, all the ramps of each pair cooperating to form a circular collar coaxial with the axis of rotation of said member, the inclined surface of the ramps of the first member being engageable with the inclined surfaces of the ramps of the second member to urge said members apart from one another, resilient means being interposed between said shaft and the non-driven face of said driven wheel to exert independently of said first and second pressure members a continuous pressure in the axial direction of said shaft against the non-driven surface of said wheel.

9. A device as defined in claim 8, in which said ramps are four in number, each ramp being equivalent to a quarter pitch of a screw thread of square cross-section and coarse pitch.

10. A device as defined in claim 8, in which said resilient means comprises at least one helical spring disposed between a bearing member for rotatably carrying said first pressure member, which bearing member is mounted in a bore in said shaft, and a base plate fixedly attached to the non-driven surface of said wheel.

11. A device as defined in claim 8, in which said resilient means comprises at least one helical spring disposed between a bearing member rotatably carrying said first pressure member, which bearing member is mounted in a bore in said shaft, and a base plate attached to or integrally formed with the non-driven surface of said wheel, said spring being directed axially of said shaft and exerting a continuous pressure on said bearing member and said plate, said base plate being rotatably supported in said bore and said second pressure member being axially displaceable relative to said shaft and being mounted in a bore of said shaft, there being an abutment member for limiting the axial displacement of said second pressure member.

12. A device as defined in claim 8, in which a ball type thrust bearing is interposed between said resilient means and said driven wheel.

13. A device as defined in claim 8, in which said inclined surfaces are steeply inclined.

14. A power transmission device for compensating for variations in the resistance torque relative to the driving torque in a friction-type change-speed gear arrangement; comprising a first pressure member mounted for rotation with the last driven wheel of the gear train of said arrangement, a second pressure member mounted for rotation with the output shaft of said arrangement, said members being engageable for drivably connecting said first member to said second member, means for maintaining said members in contact with one another when the device is operating, resilient means interposed between shaft and the non-driven face of the driving wheel to exert a continuous pressure against said face.

References Cited in the file of this patent

UNITED STATES PATENTS

| 1,036,606 | Geissler | Aug. 27, 1912 |
| 2,134,225 | Christiansen | Oct. 25, 1938 |
| 2,325,502 | Georges | July 27, 1943 |
| 2,466,964 | Perruca | Apr. 12, 1949 |
| 2,563,895 | Wildhaber | Aug. 14, 1951 |
| 2,730,904 | Rennerfelt | Jan. 17, 1956 |